(No Model.) 4 Sheets—Sheet 1.
J. A. C. DE LATOUCHE.
UTILIZATION OF FLUIDS IN CHECKING RECOIL IN ORDNANCE, &c.
No. 424,889. Patented Apr. 1, 1890.
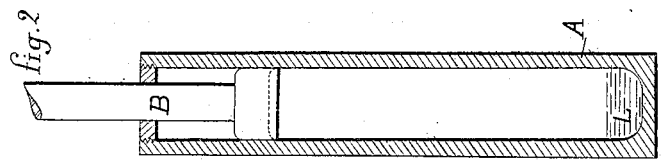
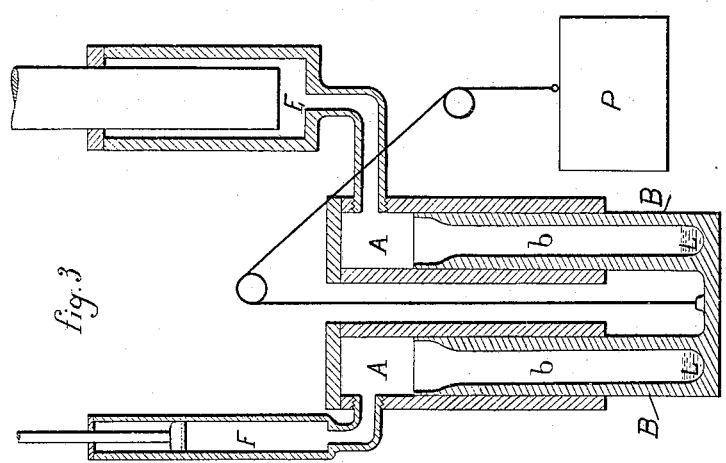
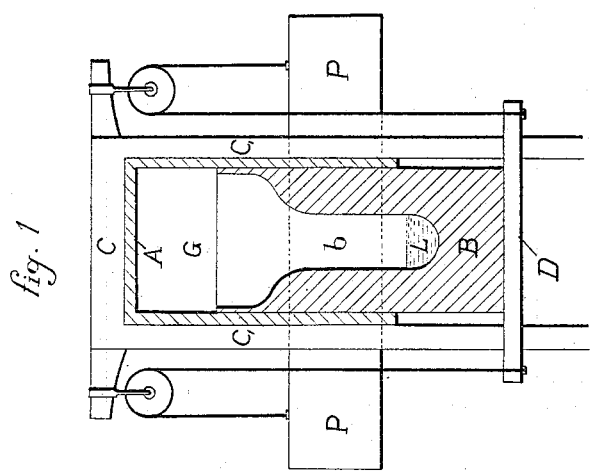
WITNESSES
INVENTOR

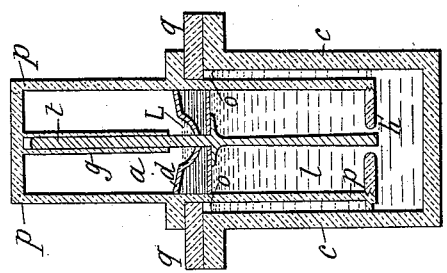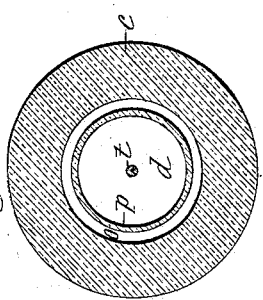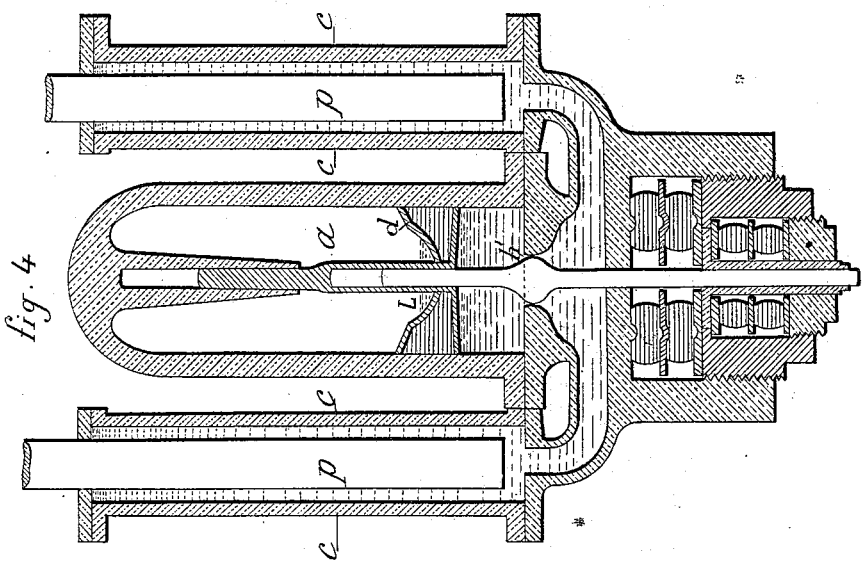

(No Model.) 4 Sheets—Sheet 3.
J. A. C. DE LATOUCHE.
UTILIZATION OF FLUIDS IN CHECKING RECOIL IN ORDNANCE, &c.
No. 424,889. Patented Apr. 1, 1890.
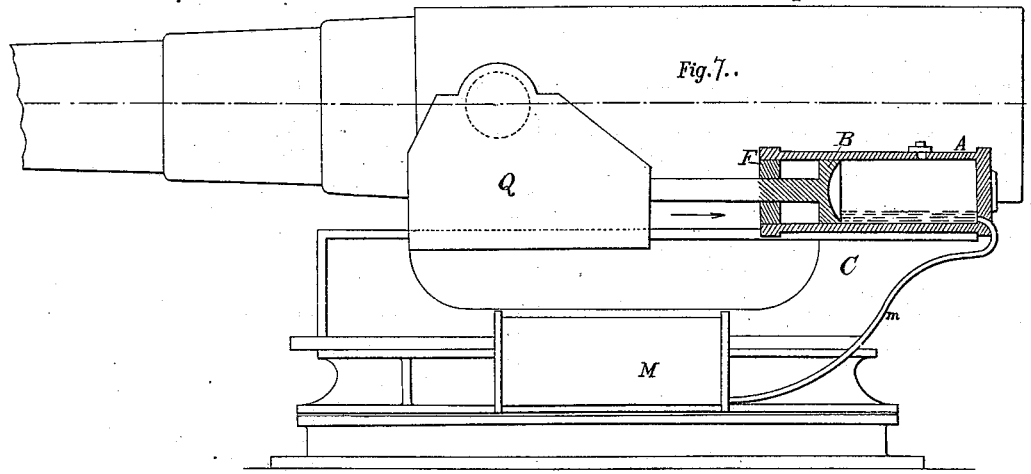
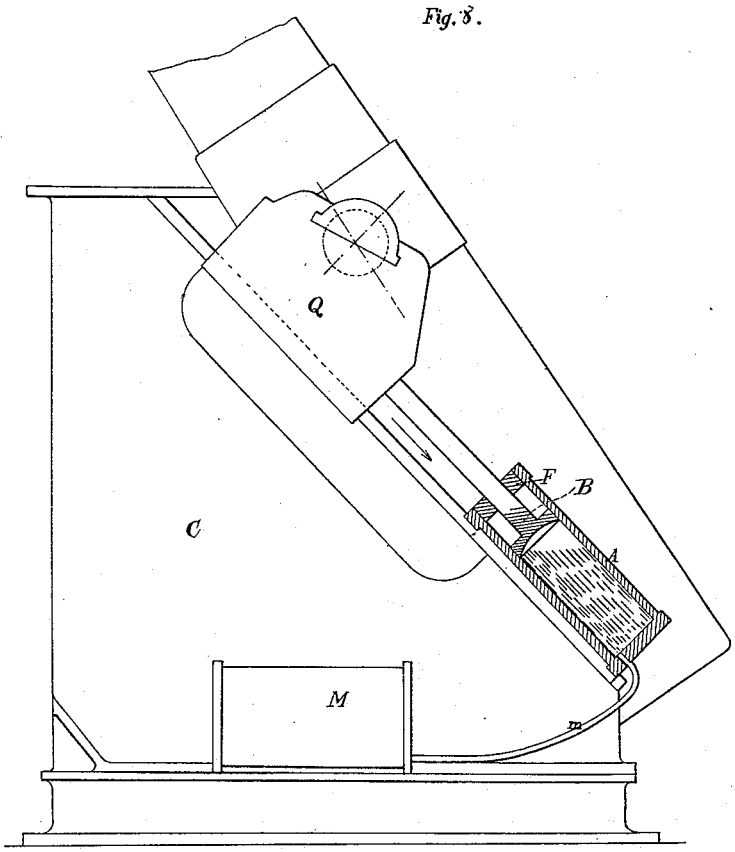

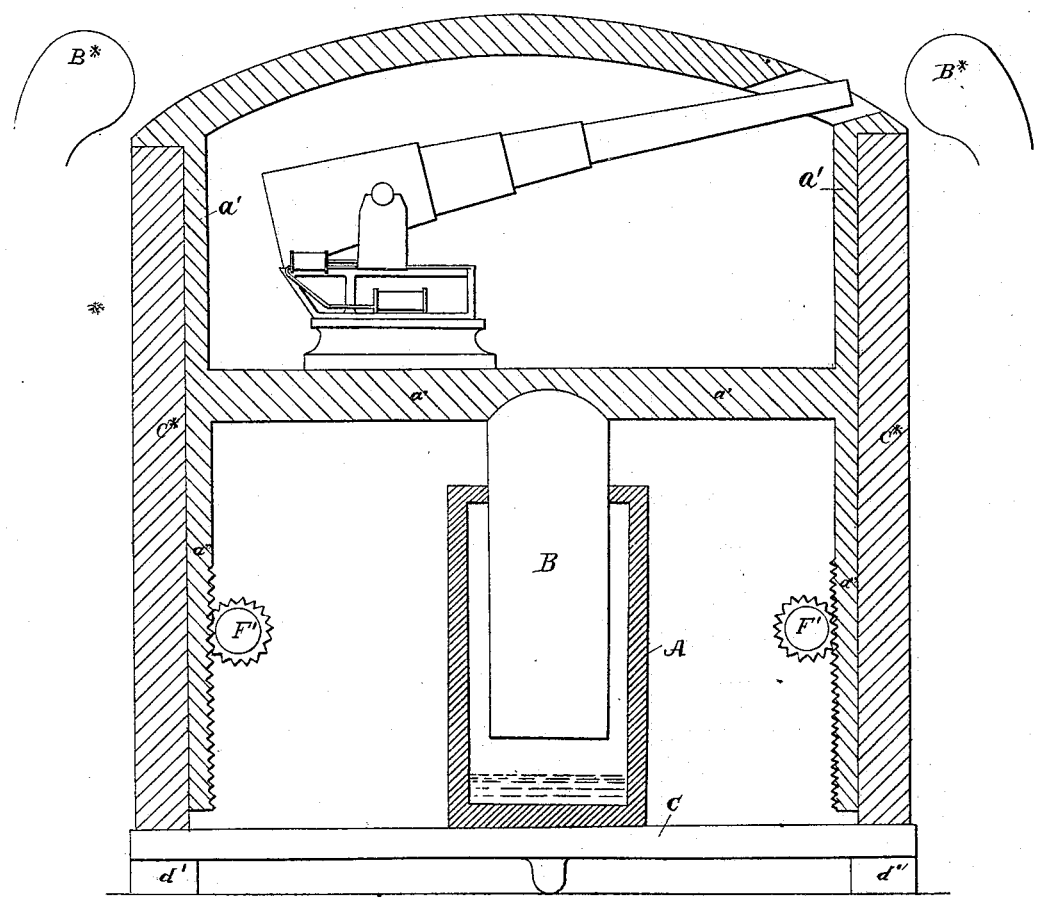

UNITED STATES PATENT OFFICE.

JACQUES ANTOINE CREUZÉ DE LATOUCHE, OF PARIS, FRANCE.

UTILIZATION OF FLUIDS IN CHECKING RECOIL IN ORDNANCE, &c.

SPECIFICATION forming part of Letters Patent No. 424,889, dated April 1, 1890.

Application filed May 29, 1889. Serial No. 312,494. (No model.)

*To all whom it may concern:*

Be it known that I, JACQUES ANTOINE CREUZÉ DE LATOUCHE, a citizen of France, residing at Paris, in the Department of the Seine, France, have invented a new and useful Improvement in the Utilization of Fluids for Checking Recoil in Ordnance and for other Purposes, of which the following is a specification.

This invention relates to apparatus or machinery employing the expansive force of aeriform fluids for the transmission, counteraction, or recovery of power, as in the case, for example, of pneumatic or hydropneumatic brakes, buffers, or maneuvering apparatus in which the whole or a part of the weight pressure or resistance of large masses is balanced, so as to enable them to be moved with less effort. Such apparatus is particularly useful in connection with ordnance for checking and controlling the recoil, but is applicable also to other uses.

One of the principal objections to this class of apparatus heretofore has been the rapid variation in the tension of the compressed gas as its volume increases or diminishes, which rapidity of variation renders the regulation very difficult. To remedy this defect, measurably, use has been made of reservoirs of large capacity relatively to the expansion or variation in volume which takes place in operation; but the presence of these reservoirs renders the apparatus containing them bulky, expensive, and difficult to change. By substituting for the permanent gas heretofore employed a fluid which is liquefied by pressure at ordinary temperatures—as carbonic-acid gas, for example, or other liquefiable gas—and taking care that the quantity of this fluid is such that a part of it is always in the liquid state and another part in the gaseous state during all the variations in size of the reservoir or chamber containing it, the pressure will be influenced only by the phenomena of heat attending the changes in the condition or state of a part of the fluid. If these changes succeed each other so rapidly in opposite directions that the loss of heat through the inclosing-walls during their progress may be neglected, the energy absorbed during compression will be almost wholly restored during expansion. In the contrary case there will be a certain loss; but the variations of pressure will always be relatively small if the weight of the fluid which remains liquid at the moment of greatest expansion is rather large in comparison with the weight of the aeriform fluid at that instant. Since the specific gravity of the liquid is always very large in comparison with that of the gas referred to the same standard, the space occupied by the liquid will always be very small in comparison with the variations in the volume of the reservoir or expansion-chamber, and the bulk of the system will be reduced to the minimum.

The invention applies or utilizes these physical properties of non-permanent gases in brakes, buffers, recuperators, and other like apparatus, the permanent gas—such as air—which ordinarily forms the spring or elastic medium in this class of apparatus being replaced by a fluid liquefiable under a suitable pressure at ordinary temperatures in such quantity that the said fluid exists always in the two forms, (liquid and gas.) By the compression a resistance sensibly constant is obtained.

The invention is applicable in general to brakes of this class now in use, and can replace in the majority of cases the counterpoises in maneuvering apparatus for balancing wholly or partially large masses, which have to be brought successively into different positions, so that they may be moved with less effort.

In the accompanying drawings, Figures 1, 2, 3, 4, and 5 are views in longitudinal section of different forms of apparatus, and Fig. 6 is a view in cross-section of the apparatus of Fig. 5. Figs. 7, 8, and 9 are views in elevation, partly in section, illustrating different modes of applying the apparatus in connection with ordnance.

In Fig. 1, P is the weight to be balanced; A, an expansion-chamber or pump-cylinder whose bottom bears against the fixed part or frame C, and B a movable hollow piston which fits closely the chamber or cylinder A and presses upon the cross-bar D, guided in ways of the frame C and connected by suitable mechanism with the weight P. The gas fills the space G in the chamber A and also the recess $b$ in the piston B, at the bottom of which is the receptacle L for the liquid, such a quantity of the latter being used that there remains a considerable quantity when the piston B is at the outer limit of its course. If the piston B is moved, the sole effect (outside the phenomena of heat due to the change in the condition of the fluid) will be to augment or diminish the quantity of liquid without modifying the tension in the chamber A, or consequently the force exerted in the crosspiece D. If, then, the section of the piston is so calculated that this force balances the weight P at a given moment, the system will remain in equilibrium in all positions, provided the connecting mechanism is so arranged that the moments are equal—that is to say, calling $l$ $l'$ the distances moved over in equal times by the weight P and piston B, respectively, and $f$ the constant force exerted on the piston, the weight P will be balanced in all directions if $fl$ equals P $l'$.

In Fig. 1 the connecting mechanism consists of cords running over simple pulleys, and $f$ equals P. It requires, therefore, only a small exertion to move the weight P from one point to another.

The arrangement of the apparatus for applying the present improvements can be varied according to the exigencies of each special case.

In Fig. 2 a brake or recoiling buffer, which gives by the use of the fluid (gas and liquid) a sensibly-constant resistance, is represented. The liquid accumulates in the receptacle L in the body of the pump or expansion-chamber A below the piston B.

The invention permits a number of independent contrivances—brakes, buffers, counterbalancing equalizers, and the like—to be connected with the same expansion-chamber without causing the operation of one to affect the others, for the interior pressure is sensibly constant in consequence of the change of state of the fluid corresponding to the variations of pressure.

In Fig. 3 the expansion-chamber A and piston B, for supporting the weight P, are annular in cross-section, and the weight is connected by a cord with the middle of the piston instead of with a cross-piece, as in Fig. 1. In this figure there are also shown two independent brakes F F, the former having a piston with piston-rod and the latter a plunger-piston, and both communicate with chamber A. The three apparatus operate independently and at the same tension, the resistances or pressure of each being regulated by the cross-section of its piston. It is evident that the number of the chambers communicating with the central reservoir or with each other can be multiplied at will. If it be desired to obtain larger resistances, the system can be applied to hydropneumatic brakes by employing a small gas-chamber and separating the same from the pressure-transmitting liquid by a piston whose upper surface is provided with a recess to receive the liquefied portion of the fluid.

Figs. 4, 5, and 6 represent such apparatus. In Fig. 4 the expansion-chamber $a$, containing the liquefiable gas, is separated by the floating piston $d$ from the water, which acts upon and transmits the pressure to the acting pistons $p$ in the pump-bodies $c$, the water passing through the orifice $h'$, whose opening is regulated by a valve. In the arrangement of Figs. 5 and 6 the reservoir $a$, which contains the partially-liquefied gas, is placed in the piston $p$. The floating or separating piston $d$ is formed with a cup on top, and the water or other liquid which transmits the pressure is contained in the chamber $c$ and enters the piston $p$ below the piston $d$. At $o$ is a leather packing. A bar $t$, fixed to the separating-piston $d$, slides in and is guided by the tube $g$. The lower end of this bar $t$ forms a valve, which regulates the opening $h'$, through which the water enters the piston.

In Fig. 7 the apparatus is shown applied to a siege-gun. The gun proper is mounted on trunnions in a slide Q, traversing in the direction of the recoil in ways of the foundation C and connected with the piston B of the accumulator or recoil apparatus. The piston-rod works through a stuffing-box F. The cylinder A of this apparatus is shown connected by a small tube $m$ with a reservoir M of the liquefied gas. When the gun is fired, it will be brought easily to rest within a certain distance by the constant resistance offered by the fluid in the cylinder A to the inward movement of the piston B, and will after it has been brought to rest be returned to the firing position by the pressure of said fluid forcing the said piston outward.

In Fig. 8 the slide Q moves in ways inclined to the horizontal, so that the pressure of the fluid in the cylinder A operates partly to support the gun as well as to check the recoil and to return the gun. By suitable means, which will be readily understood by those skilled in the art, the gun may be retained in the position of extreme recoil for loading or other purposes and afterward allowed to return to firing position.

In Fig. 9 the gun is mounted in a cage $a'$, which is capable of sliding vertically in the turret C*, which latter rests on the base C, turning on rollers $d'$, and the cage is provided with a piston or ram B, working in the cylinder or expansion-chamber A, containing the fluid partly liquefied and partly in a gaseous condition. The weight of the cage, the inclosed gun, and other parts carried by said cage is balanced in whole or in part by the pressure of the fluid in the cylinder A against the piston B. By means of the rack $a''$ and pinion F' the cage and its contents can be raised and lowered. At B* is indicated the limit of the protecting-armor for the turret.

I claim—

The improvement in applying pressure for checking and controlling the recoil in guns and for other purposes by maintaining a liquefiable gas partly in a liquid and partly in a gaseous condition, transmitting its pressure to the gun or object to be controlled, and causing successive portions of the said fluid to pass from the liquid to the gaseous condition as the pressure tends to fall and to pass from the gaseous to the liquid condition as the pressure tends to rise, substantially as described.

In testimony whereof I have signed this specification in the presence of two subscribing witnesses.

JACQUES ANTOINE CREUZÉ DE LATOUCHE.

Witnesses:
C. KURER,
R. J. PRESTON.